United States Patent [19]

MacLeay

[11] 4,086,224
[45] Apr. 25, 1978

[54] REDUCTION PROCESS FOR MAKING AZO COMPOUND

[75] Inventor: Ronald Edward MacLeay, Williamsville, N.Y.

[73] Assignee: Pennwalt Corporation, Philadelphia, Pa.

[21] Appl. No.: 664,604

[22] Filed: Mar. 8, 1976

Related U.S. Application Data

[63] Continuation of Ser. No. 526,641, Nov. 26, 1974, abandoned, and a continuation-in-part of Ser. No. 453,451, Mar. 21, 1974, abandoned.

[51] Int. Cl.$^2$ .............. C07C 107/00; C07C 107/02; C07C 107/04
[52] U.S. Cl. .............. 260/192; 260/2.5 R; 260/2.5 AN; 260/152; 260/156; 260/465 E; 260/566 B; 528/492; 252/426; 252/438
[58] Field of Search ............. 260/192

[56] References Cited

U.S. PATENT DOCUMENTS

| | | | |
|---|---|---|---|
| 2,484,841 | 9/1949 | Lorand | 260/618 B |
| 2,491,926 | 12/1949 | Lorand et al. | 260/618 B |
| 2,854,487 | 9/1958 | Quinn | 260/618 B |
| 2,967,897 | 1/1961 | Sharp et al. | 260/610 R X |
| 2,987,556 | 6/1961 | Brill | 260/617 |
| 3,364,266 | 1/1968 | Farrissey et al. | 260/610 R |
| 3,476,816 | 11/1969 | Farrissey | 260/617 |

OTHER PUBLICATIONS

Clement, Chemical Abstracts, vol. 60, 11919b, (1966).
Houben–Weyl, "Methoden der Organischen Chemie," vol. VIII/3, p. 63, (1952).
Theilheimer, "Synthetic Methods of Organic Chemistry," vol. 1, 1942–1944, p. 4, Nos. 15 and 16, (1948).
Theilheimer, "Synthetic Methods of Organic Chemistry," vol. 24, p. 59, No. 122, (1970).

*Primary Examiner*—Floyd D. Higel

[57] ABSTRACT

A process for preparing an alpha-hydroxyazoalkane of the formula

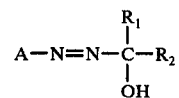

wherein A is aryl or $(R)_3C$ and R, $R_1$ and $R_2$ are hydrogen, monovalent aromatic or monovalent aliphatic radicals with the provisos that (i) only one of $R_1$ and $R_2$ may be (a) hydrogen or (b) aromatic and (ii) no more than one R is aromatic by reacting the corresponding α-hydroperoxyazoalkane with a mild reducing agent in a non-acidic medium.

5 Claims, No Drawings

REDUCTION PROCESS FOR MAKING AZO COMPOUND

This is a continuation of application Ser. No. 526,641, filed Nov. 26, 1974, now abandoned. This application is a continuation-in-part to my application Ser. No. 453,451 filed Mar. 21, 1974 (now abandoned).

BRIEF SUMMARY OF THE INVENTION

This invention relates to a process for preparing an alpha-hydroxyazoalkane of the formula

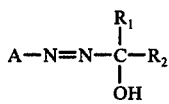

wherein A is aryl or $(R)_3C$ and R, $R_1$ and $R_2$ are hydrogen, monovalent aromatic or monovalent aliphatic radicals with the provisos that (i) only one of $R_1$ and $R_2$ may be (a) hydrogen or (b) aromatic and (ii) no more than one R is aromatic, by reacting the corresponding hydroperoxy analogue with a mild reducing agent in a non-acidic medium.

BACKGROUND OF THE INVENTION

Similar compounds have been made by S. Hunig and G. Buttner from t-butyldiazenes and aldehydes (Angew. Chemie Int. Ed. 8, 451, 1969) and alkoxydiazenium salts and the hydroxide ion (Ber, 104, 1088, 1971). The hydroperoxy starting compound for the process of the present invention is conveniently prepared by oxidizing the corresponding hydrazone as taught in Ser. No. 88,248 and Ser. No. 88,249, both filed Nov. 9, 1970 both now abandoned. A process for forming appropriate hydrazones can be found in British Pat. No. 1,291,317 dated Oct. 4, 1972.

DETAILED DESCRIPTION OF THE INVENTION

This invention relates to a process for making an alpha-hydroxyazoalkane of the formula

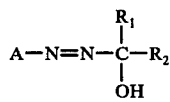

(I)

which comprises reacting a compound of the formula

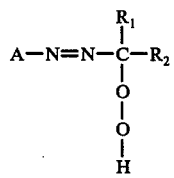

(II)

with a mild reducing agent in a non-acidic medium, the letter A in said formulae representing aryl or $(R)_3C$ and the letters R, $R_1$, and $R_2$ representing hydrogen, monovalent aromatic and monovalent aliphatic radicals with the provisos that only one of $R_1$ and $R_2$ may be (a) hydrogen or (b) aromatic and no more than one R is aromatic. The preferred reducing agent is a dilute aqueous medium sulfite solution.

THE EXAMPLES

The invention will be more readily understood by reference to the Examples which are intended merely to illustrate the invention and not to limit it in any manner.

EXAMPLE I

Preparation of 1-t-Butylazo-1-hydroxybutane

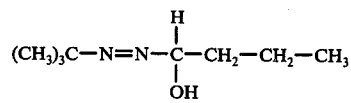

Butyraldehyde t-butylhydrazone is prepared by refluxing an aqueous solution of t-butylhydrazine and an equivalent amount of butyraldehyde for approximately 1 hour. The organic layer that forms is separated, dried over anhydrous sodium sulfate and filtered. Then 80 grams (0.563 moles) of this material is dissolved in 100 ml of pentane, transferred to a 250 ml jacketed reactor equipped with a mechanical stirrer, thermometer, condenser, and oxygen inlet tube and warmed to 30° C. with rapid stirring while oxygen is slowly bubbled into the solution. The reaction is monitored by following the disappearance of the butyraldehyde t-butylhydrazone by vapor phase chromatography. After the reaction is 50% complete, the reaction temperature is lowered to 20° C. and held there for the remainder of the oxidation. After the reaction is complete, the temperature is lowered to 0° C.

One-half of the pentane solution is removed and stored in dry ice. Then with rapid stirring 5% aqueous sodium sulfite solution is added to the remaining one-half of the solution in 50 ml increments. The reaction is followed by vapor phase chromatography and requires 1600 ml of 5% $Na_2SO_3$ solution before the hydroperoxide is completely reduced. After the reaction is complete, the pentane solution is washed with 10% aqueous sodium bicarbonate solution, dried over anhydrous sodium sulfate, filtered and the pentane stripped off on a rotating evaporator at 10° C. The residue weighs 29 grams (approx. 65% crude yield) and in its infrared spectrum is in agreement with the structure of 1-t-butylazo-1-hydroxybutane. The product is stored in a dry ice chest.

The same technique is followed to prepare the hydroxyazoalkanes identified in Table I, using the appropriate hydrazine and aldehyde or ketone as starting materials. Yields reported are based on the weight of the intermediate hydrazone used to prepare the hydroperoxyazoalkane.

TABLE I

| Example Number | Hydrazine | Ketone or Aldehyde | Alpha-Hydroxyazoalkane | % Yield |
|---|---|---|---|---|
| 2 | methylhydrazine | cyclohexanone | 1-methylazo-1-hydroxycyclohexane | 42.5 |
| 3 | methylhydrazine | methyl isobutyl ketone | 2-methylazo-2-hydroxy-4-methylpentane | 56 |
| 4 | methylhydrazine | 2-heptanone | 2-methylazo-2-hydroxyheptane | 84 |
| 5 | methylhydrazine | methyl neopentyl ketone | 2-methylazo-2-hydroxy-4,4-dimethylpentane | 68 |
| 6 | methylhydrazine | ethyl butyl ketone | 3-methylazo-3-hydroxyheptane | 67 |
| 7 | methylhydrazine | heptaldehyde | 1-methylazo-1-hydroxyheptane | 90 |

TABLE I-continued

| Example Number | Hydrazine | Ketone or Aldehyde | Alpha-Hydroxyazoalkane | % Yield |
|---|---|---|---|---|
| 8 | methylhydrazine | 2-methylvaleraldehyde | 1-methylazo-1-hydroxy-2-methylpentane | 75 |
| 9 | methylhydrazine | valeradehyde | 1-methylazo-1-hydroxypentane | 64 |
| 10 | 2-hydroxyethylhydrazine | methyl isobutyl ketone | 2-(2-hydroxyethylazo)-2-hydroxy-4-methylpentane | 52 |
| 11 | benzylhydrazine | acetone | 2-benzylazo-2-hydroxypropane | 91 |
| 12 | benzylhydrazine | methyl ethyl ketone | 2-benzylazo-2-hydroxybutane | 91 |
| 13 | n-butylhydrazine | acetone | 2-n-butylazo-2-hydroxypropane | 45 |
| 14 | n-butylhydrazine | methyl ethyl ketone | 2-n-butylazo-2-hydroxybutane | 86 |
| 15 | n-propylhydrazine | acetone | 2-n-propylazo-2-hydroxypropane | 21 |
| 16 | n-propylhydrazine | methyl ethyl ketone | 2-n-propylazo-2-hydroxybutane | 37 |
| 17 | n-octylhydrazine | acetone | 2-n-octylazo-2-hydroxypropane | 98 |
| 18 | n-octylhydrazine | methyl ethyl ketone | 2-n-octylazo-2-hydroxybutane | 99 |
| 19 | n-dodecylhydrazine | acetone | 2-n-dodecylazo-2-hydroxypropane | 99 |
| 20 | n-dodecylhydrazine | methyl ethyl ketone | 2-n-dodecylazo-2-hydroxybutane | 82 |
| 21 | n-dodecylhydrazine | isobutyraldehyde | 1-n-dodecylazo-1-hydroxy-2-methylpropane | 97 |
| 22 | t-butylhydrazine | benzaldehyde | 1-t-butylazo-1-hydroxyphenylmethane | 70 |
| 23 | t-butylhydrazine | propionaldehyde | 1-t-butylazo-1-hydroxypropane | 46 |
| 24 | t-butylhydrazine | valeraldehyde | 1-t-butylazo-1-hydroxypentane | 77 |
| 25* | t-butylhydrazine | 2-ethylbutyraldehyde | 1-t-butylazo-1-hydroxy-2-ethylbutane | 90 |
| 26* | t-butylhydrazine | heptaldehyde | 1-t-butylazo-1-hydroxyheptane | 90 |
| 27 | t-butylhydrazine | n-butyl levulinate | n-butyl 4-t-butylazo-4-hydroxyvalerate | 94 |
| 28 | phenylhydrazine | methyl ethyl ketone | 1-phenylazo-1-hydroxybutane | 89 |
| 29 | phenylhydrazine | acetone | 1-phenylazo-1-hydroxypropane | 63 |
| 30 | isopropylhydrazine | valeraldehyde | 1-isopropylazo-1-hydroxypentane | 60 |
| 31 | isopropylhydrazine | isobutryaldehyde | 1-isopropylazo-1-hydroxy-2-methylpropane | 55 |
| 32 | cyclohexylhydrazine | propionaldehyde | 1-cyclohexylazo-1-hydroxypropane | 60 |

*10% aq. soln. of $Na_2SO_3$ used.

Other compounds, typical of those which can be made by the process of this invention, are 2-t-cumylazo-2-hydroxypropane,
2-t-butylazo-2-hydroxy-tetradecane,
1-t-butylazo-1-cyclopropyl-1-hydroxyethane,
1-t-adamantylazo-1-cyclohexyl-1-hydroxyethane,
1-[t-(alpha-methyl-alpha-ethyl-nonyl)azo]-1-cyclododecyl-1-hydroxyethane,
1-[t-(alpha,alpha-dimethyl-beta-phenylethyl)azo]-1-cyclopentyl-1-hydroxyethane,
1-[t-(1,1-dimethyl-7-phenylheptyl)azo]-1-cyclooctyl-1-hydroxyethane,
1-[t-(p-t-butylcumyl)azo]-1-norborn-2-yl-1-hydroxyethane,
1-[t-(1-(phenanthr-2-yl)-1-methylethyl)azo]-1-adamant-2-yl-1-hydroxyethane,
2-[t-(decalylazo)]-2-hydroxy-1-phenylpropane,
3-[t-(1-methylcyclopentyl)azo]-3-hydroxy-1-naphth-2-ylbutane,
2-[t-(alpha-methyl-alpha-ethylpropyl)azo]-2-hydroxy-1-(p-t-butyl)phenylpropane,
1-[t-(alpha,alpha-diethylpropyl)azo]-1-hydroxy-1-phenylethane,
2-t-(amylazo)-2-hydroxy-5-phenylpentane,
1-[t-(alpha,alpha-dimethylpentyl)azo]-1-hydroxy-1-phenanthr-2-ylethane,
1-[t-(alpha-methyl-alpha-cyclopropylethyl)azo]-1-hydroxy-1-naphth-2-ylethane,
2-[t-(alpha,alpha-dimethyl-beta-phenylethyl)azo]-2-hydroxybutane,
2-[t-(1-methylcyclododecyl)azo]-2-hydroxypropane,
1-[t-(alpha-methyl-alpha-cyclododecylethyl)azo]-1-hydroxycyclobutane,
2-[t-(alpha-methyl-alpha-cyclooctylethyl)azo]-2-hydroxy(2.2.2-bicyclooctane),
1-[t-(alpha-methyl-alpha-(norborn-2-yl)ethyl)azo]-1-hydroxycyclododecane,
1-[t-(alpha-methyl-alpha-(2.2.2-bicyclooct-2-yl))azo]-1-hydroxycyclooctane,
1-[t-(alpha-t-adamantyl-alpha-methylethyl)azo]-1-hydroxycyclodecane,
2-[t-(1,1-dimethyl-4-phenylbutyl)azo]-2-hydroxynorbornane,
2-[t-(alpha-methyl-alpha-naphth-2-ylethyl)azo]-2-hydroxyadamantane,
2-[t-(1-methylcyclopropyl)azo]-2-hydroxy-4-methyl-4-phenoxypentane,
2-[t-(2-methylnorborn-2-yl)azo]-2,4-dihydroxy-4-methylpentane,
2-[t-(alpha,alpha-dimethyl-gamma-naphth-2-ylpropyl)azo]-2,5-dihydroxypentane,
Phenyl 5-[t-(alpha-methyl-alpha-naphth-2-ylethyl)azo]-5-hydroxyhexanoate,
1-[t-(alpha-methyl-alpha(p-methylphenyl)ethyl)azo]-1-hydroxy-1-(p-chlorophenyl)ethane,
1-[t-(1-methylcyclohexyl)azo]-1-hydroxy-1-(m-bromophenyl)ethane,
1-[t-(1-methylcyclooctyl)azo]-1-hydroxy-1-(p-fluorophenyl)ethane,
1-[t-(butyl)azo]-1-hydroxy-1-(p-iodophenyl)propane,
3-[t-(butyl)azo]-3-hydroxy-1-benzoyloxybutane,
1-[t-(amyl)azo]-1-hydroxy-1-(p-cyanophenyl)ethane,
2-[t-(1,1,3,3-tetramethylbutyl)azo]-2-hydroxy-5-aminopentane,
1-[t-(1,1,3-trimethylbutyl)azo]-1-hydroxy-1-cyclobutylethane,
2-[t-(alpha,alpha-dimethylbenzyl)azo]-2-hydroxytetralin,
4-[t-(alpha,alpha-diisobutylethyl)azo]-4-hydroxy-2,7-dimethylheptane,
2-[t-(1,1,3,3-tetramethylbutyl)azo]-2-hydroxy-3,3-dimethylbutane,
2-[t-(alpha,alpha-dimethyl-p-chlorobenzyl)azo]-2-hydroxy-4,4-dimethylpentane,
2-[t-(alpha,alpha-dimethyl-m-bromobenzyl)azo]-2-hydroxydecane,
2-[t-(alpha,alpha-dimethyl-p-cyanobenzyl)azo]-2-hydroxyindane,
1-[t-(2-methyltetral-2-yl)azo]-1-hydroxy-1-(fur-2-yl)ethane,
1-[t-(alpha,alpha-diisobutylethyl)azo]-1-hydroxy-1-tetrahydrofur-2-yl)ethane,
1-[t-(alpha,alpha,beta,beta-tetramethylpropyl)azo]-1-hydroxy-1-(pyrid-4-yl)ethane,
1-[t-alpha,alpha-dibenzylethyl)azo]-1-hydroxy-1-(thiophen-2-yl)ethane, 1-[t-(2-methylindan-2-yl)azo]-1-hydroxy-1-(anthracen-9-yl)ethane,
1-[t-(alpha,alpha-dicyclopropylethyl)azo]-1-hydroxy-1-(pyrid-2-yl)ethane,
2-[t-(alpha,alpha-dicyclohexylethyl)azo]-2-hydroxy-3-methylbutane,
2-(pentadec-2-ylazo)-2-hydroxypropane,
2-(oct-2-ylazo)-2-hydroxypropane,
1-[1-(cyclopropyl)ethylazo]-1-hydroxy-1-cyclopropylethane,
1-[1-(cyclohexyl)ethylazo]-1-hydroxy-1-cyclohexylethane,
1-[1-(cyclododecyl)ethylazo]-1-hydroxy-1-dodecylethane,
1-[1-(cyclopentyl)ethylazo]-1-hydroxy-1-cyclopentylethane,
1-[1-(cycloheptyl)ethylazo]-1-hydroxy-1-cycloheptylethane,
2-1-(cycloheptyl)ethylazo]-2-hydroxypropane,
1-[1-(norborn-2-yl)ethylazo]-1-hydroxy-1-norborn-2-ylethane,
1-[1-(adamant-2-yl)ethylazo]-1-hydroxy-1-adamant-2-ylethane,
2-[1-(phenyl)prop-2-ylazo]-2-hydroxy-1-phenylpropane,
2-[4-(naphth-2-yl)but-2-ylazo]-2-hydroxy-4-phenylbutane,
2-[1-(p-t-butylphenyl)prop-2-ylazo]-2-hydroxy-1-(p-t-butylphenyl)propane,
1-[1-(phenyl)ethylazo]-1-hydroxy-1-phenylethane,
2-[5-(phenyl)pent-2-ylazo]-2-hydroxy-5-phenylpentane,
1-[1-(phenanthr-2-yl)ethylazo]-1-hydroxy-1-(phenanthr-2-yl)ethane,
1-[1-(naphth-2-yl)ethylazo]-1-hydroxy-1-(naphth-2-yl)ethane,
2-[1-(p-methylphenyl)ethylazo]-2-hydroxybutane,
2-cyclopropylazo-2-hydroxypropane,
1-cyclododecylazo-1-hydroxycyclododecane,
1-cyclopentylazo-1-hydroxycyclobutane,
1-cycloheptylazo-1-hydroxycycloheptane,
1-cyclononylazo-1-hydroxycyclononane,
2-(norborn-2-ylazo)-2-hydroxynorbornane,
2-(2.2.2-bicyclooct-2-ylazo)-2-hydroxy(2.2.2-bicyclooctane),
2-adamant-2-ylazo-2-hydroxyadamantane,
2-(4-methoxy-4-methylpent-2-ylazo)-2-hydroxypropane,
2-(4-phenoxy-4-methylpent-2-ylazo)-2-hydroxy-4-phenoxy-4-methylpentane,
2-(4-hydroxy-4-methylpent-2-ylazo)-2,4-dihydroxy-4-methylpentane,
2-(5-hydroxypent-2-ylazo)-2,5-dihydroxypentane,
2-(4-acetoxybut-2-ylazo)-2-hydroxypropane,
2-[4-(n-butoxycarbonyl)but-2-ylazo]-2-hydroxypropane,
Phenyl 5-[5-(phenoxycarbonyl)pent-2-ylazo]-5-hydroxyhexanoate,
1-[1-(p-chlorophenyl)ethylazo]-1-hydroxy-1-(p-chlorophenyl)ethane,
1-[1-(m-bromophenyl)ethylazo]-1-hydroxy-1-(m-bromophenyl)ethane,
1-[1-(p-fluorophenyl)ethylazo]-1-hydroxy-1-(p-fluorophenyl)ethane,
1-[1-(p-iodophenyl)propylazo]-1-hydroxy-1-(p-iodophenyl)propane,
2-[4-(benzoyloxy)but-2-ylazo]-2-hydroxy-4-(benzoyloxy)-butane,
1-[1-(p-cyanophenyl)ethylazo]-1-hydroxy-1-(p-cyanophenyl)ethane,
2-(5-aminopent-2-ylazo)-2-hydroxy-5-aminopentane,
2-(4-methylcyclohexylazo)-2-hydroxypropane,
1-cyclobutylazo-1-hydroxy-1-cyclobutylethane,
2-[(2,2,4,4-tetramethyl-3-oxo)cyclobutylazo]-2-hydroxy-propane,
2-[1-(ethoxycarbonyl)prop-2-ylazo]-2-hydroxypropane,
2-(tetral-2-ylazo)-2-hydroxytetralin,
2-[1,3-di-(ethoxycarbonyl)prop-2-ylazo]-2-hydroxypropane,
4-[2,6-(dimethyl)hept-4-ylazo]-4-hydroxy-2,6-dimethylheptane,
2-[3,3-(dimethyl)but-2-ylazo]-2-hydroxy-3,3-dimethylbutane,
2-[4,4-(dimethyl)pent-2-ylazo]-2-hydroxy-4,4-dimethylpentane,
2-[1,3-(diphenyl)prop-2-ylazo]-2-hydroxydecane,
2-(tridec-7-ylazo)-2-hydroxypropane,
2-(1-phenyl-5-acetoxypentylazo)-2-hydroxypropane,
2-[4-(t-butyl)cyclohexylazo]-2-hydroxybutane,
2-(1-methoxyprop-2-ylazo)-2-hydroxyoctane,
2-indan-2-ylazo-2-hydroxyindane,
2-(dicyclopropylmethylazo)-2-hydroxypropane,
1-cyclohexylazo-1-(fur-2-yl)-1-hydroxyethane,
1-cyclohexylazo-1-(tetrahydrofur-2-yl)-1-hydroxyethane,
1-cyclohexylazo-1-hydroxy-1-(pyrid-4-yl)ethane,
1-cyclopentylazo-1-hydroxy-1-(thiophen-2-yl)ethane,
1-isopropylazo-1-hydroxy-1-(anthracen-9-yl)ethane,
1-isopropylazo-1-hydroxy-1-(pyrid-2-yl)ethane,
1-methylazo-1-hydroxy-1-cyclooctylethane,
1-ethylazo-1-hydroxy-1-cyclopropylethane,
1-propylazo-1-hydroxy-1-cyclohexylethane,
1-isobutylazo-1-hydroxy-1-cyclododecylethane,
1-butylazo-1-hydroxy-1-cyclopentylethane,
1-amylazo-1-hydroxy-1-norborn-2-ylethane,
1-isoamylazo-1-hydroxy-1-adamant-2-ylethane,
2-(2-methylbutylazo)-2-hydroxy-1-phenylpropane,
2-neopentylazo-2-hydroxy-4-(beta-naphthyl)butane,
2-hexylazo-2-hydroxy-1-(p-t-butylphenyl)propane,
1-heptylazo-1-hydroxy-1-phenylethane,
2-octylazo-2-hydroxy-5-phenylpentane,
1-nonylazo-1-hydroxy-1-(phenanthr-2-yl)ethane,
1-decylazo-1-hydroxy-1-(naphth-2-yl)ethane,
1-undecylazo-1-hydroxycyclododecane,
1-dodecylazo-1-hydroxycyclobutane,
1-cyclohexylcarbinylazo-1-hydroxycyclooctane,
1-cyclopropylcarbinylazo-1-hydroxycyclodecane,
2-cyclododecylcarbinylazo-2-hydroxynorbornane,
2-cyclopentylcarbinylazo-2-hydroxy(2.2.2-bicyclooctane),
2-(norborn-2-ylcarbinylazo)-2-hydroxyadamantane,
2-(2.2.2-bicyclooct-2-ylcarbinylazo)-2-hydroxy-4-methylpentane,
2-(adamant-1-ylcarbinylazo)-2-hydroxy-4-phenoxy-4-methylpentane,
2-(2-phenylethylazo)-2,4-dihydroxy-4-methylpentane,
2-[3-(beta-naphthyl)propylazo]-2,5-dihydroxypentane,
Phenyl 4-[beta-(3,4-dimethylphenyl)ethylazo]-4-hydroxyhexanoate,
1-benzylazo-1-hydroxy-1-(p-chlorophenyl)ethane,
1-(phenanthr-1-ylcarbinylazo)-1-hydroxy-1-(m-bromophenyl)ethane,
1-(beta-naphthylcarbinylazo)-1-hydroxy-1-(p-fluorophenyl)ethane,
1-(p-chlorobenzylazo)-1-hydroxy-1-(p-iodophenyl)ethane, 2-(m-bromobenzylazo)-2-hydroxy-4-(benzoyloxy)butane
1-(p-fluorobenzylazo)-1-hydroxy-1-(p-cyanophenyl)ethane,
2-(m-methoxybenzylazo)-2-hydroxy-5-aminopentane,
2-(beta-methoxyethylazo)-2-hydroxytetralin,
4-(beta-cyanoethylazo)-4-hydroxy-2,6-dimethylheptane,
2-(beta-phenoxyethylazo)-2-hydroxydecane,
2-[beta-(ethoxycarbonyl)ethylazo]-2-hydroxyindane,
1-(beta-carboxyethylazo)-1-hydroxy-1-(anthracen-9-yl)ethane,
3-[beta-(phenoxycarbonyl)ethylazo]-3-hydroxyheptane,
2-[beta-(benzoyloxy)ethylazo]-2-hydroxy-3,3-dimethylbutane,
1-(beta-aminoethylazo)-1-hydroxy-1-phenylpropane,
2-(beta-naphthylazo)-2-hydroxypropane,
2-(4-methoxynaphth-1-ylazo)-2-hydroxybutane,
2-(9-anthrylazo)-2-hydroxypentane,
2-(9-phenanthrylazo)-2-hydroxypropane,
1-[2-(methoxycarbonyl)-phenanthr-9-ylazo]-1-hydroxyethane, and
2-(2,4,6-trichlorophenylazo)-2-hydroxy-3-methylbutane.

The compounds made by the process of the present invention are very useful as polymerization initiators for vinyl monomers, foaming agents for polyester resins and blowing and foaming agents for polymers.

While the invention has been specifically illustrated with dilute aqueous sodium sulfite as the reducing agent, other mild reducing agents such as potassium iodide, phosphines (e.g. triphenylphosphine), sodium borohydride, sodium thiosulfate, sodium and alcohol, lithium aluminum hydride, aluminum isopropoxide and sodamide can be employed. Hydrogen in the presence of a hydrogenation catalyst such as Raney nickel, platinum on carbon, platinum oxide, palladium on charcoal, is also suitable. The mole ratio of reducing agent to azohydroperoxide should be at least 1:1 to insure complete reduction; preferably it is useful to use a 5-15% molar excess of reducing agent. Due to the acid sensitivity of the alpha-hydroxyazo products and the azohydroperoxide starting material, it is essential that the pH of the reducing system be at pH 7 or above at the beginning and throughout the reduction. Thus, while sodium bisulfite will reduce the hydroperoxide, the yield of product suffers due to acidic decomposition of the alpha-hydroperoxyazoalkane. Aqueous sodium sulfite solution is the preferred reducing system. The concentration of the solution can vary from ½% to a saturated solution; however, the more concentrated the solution, the slower it must be added to control the reaction exotherm.

The temperature range for performing the reduction reactions should take into consideration the thermal stability of the starting azohydroperoxide and the final product. Therefore the reduction should be run below 60° C., preferably below 35° C., and most preferably below 25° C. Since the azohydroperoxide reacts very readily, the lower temperature limit will be controlled by the freezing point of the aqueous solution. Preferably, the reaction should be run above −10° C. and most preferably above −5° C. Since the reaction is exothermic, the temperature can be controlled by external cooling and by controlling the rate at which the reactants are combined.

Any inert reaction medium may be used. Since the azohydroperoxide and the alpha-hydroxyazos are quite soluble in hydrocarbons, chlorinated hydrocarbons, alcohols, ethers, esters and nitriles, any of these inert solvents are suitable as reaction media provided the reaction is not run below the freezing point of the solvent. Examples of such suitable solvents are pentane, hexane, heptane, octane, methanol, ethanol, isopropanol, propanol, n-butyl alcohol, isobutyl alcohol, t-butyl alcohol, nonane, decane, dodecane, cyclohexane, methylcyclohexane, cyclopentane, benzene (above 5° C.), toluene, dichlorobenzene, trichlorobenzene, t-butylbenzene, xylene, methylene chloride, chloroform, carbon tetrachloride, perchloroethylene, mineral spirits, styrene, alpha-methylstyrene, diethyl ether, dipropyl ether, di-n-butyl ether, dioxane, tetrahydrofuran, ethyl acetate, methyl acetate, ethyl benzoate, acetonitrile and propionitrile. The concentration of the azohydroperoxide in the solvent can vary from 1% to 99% but for practical reasons it is preferable to use a concentration above 25%. For safety reasons it is preferable to use a concentration of 75% or less. Because many of the products produced by the process of this invention and the corresponding hydroperoxy analogues used as starting materials are thermally unstable and shock sensitive, extreme care should be exercised in their preparation, isolation and subsequent storage. If it is desirable to isolate the final alpha-hydroxyazo it is recommended that a low boiling hydrocarbon be used as a solvent, such as pentane or hexane.

As will be apparent from the specific examples identifying products which can be formed by the process of the present invention, the term "aliphatic" as applied to formulas (I) and (II) is intended to comprehend substituted and unsubstituted alkyl, aralkyl and cycloalkyl and the term "aromatic" is intended to include substituted and unsubstituted mono- and polynuclear aryl radicals. Thus, restating the definitions of A, R, $R_1$ and $R_2$ in formulas (I) and (II) with greater specificity for illustrative purposes, A is an organic radical from the class consisting of aryl and $(R)_3C-$. The aryl group may be mono- or polynuclear containing from 6 to 14, but preferably no more than 10 carbon atoms; it may be substituted. Phenyl and substituted phenyl are preferred. R is hydrogen, lower alkyl radical of 1 to 11 carbons, preferably 1 to 6 carbons, cycloalkyl, bicycloalkyl or tricycloalkyl radical of 3 to 12 carbons, preferably 3 to 8 carbons, an aralkyl radical of 7 to 12 carbons, preferably 7 to 9 carbons, an aryl or substituted aryl radical of 6 to 14 carbons, preferably 6 to 10 carbons and most preferably phenyl or substituted phenyl and not more than one R may be aryl. In addition, the R radicals may be joined to form a cyclo, bicyclo or tricyclo radical of 3 to 12 carbons.

$R_1$ and $R_2$ are selected from: an alkyl radical of 1 to 12 carbons, preferably 1 to 6 carbons, a cycloalkyl, bicycloalkyl or tricycloalkyl radical of 3 to 12 carbon atoms, preferably 3 to 8 carbon atoms, an aralkyl radical of 7 to 12 carbon atoms, preferably 7 to 9 carbons and a five or six-membered heterocyclic radical. In addition, $R_2$ may also be an aryl or substituted aryl radical of 6 to 14 carbon atoms, preferably 6 to 10 carbon atoms and most preferably phenyl or substituted phenyl. In addition, $R_1$ may also be hydrogen; and $R_1$ and $R_2$ together may form an alkylene diradical of 3 to 11 carbon atoms, preferably 4 to 7 carbons, and one or more of each of A, $R_1$ and $R_2$ (or the alkylene diradical formed from $R_1$ and $R_2$) may be substituted with radicals selected from: alkoxy, preferably lower alkoxy, (lower indicating about 1 to 4 carbon atoms), aryloxy (preferably phenoxy), lower alkyl, hydroxy, alkoxycarbonyl, aryloxycarbonyl, acyloxy, halogen (preferably chlorine or bromine), alkenyl or alkynyl.

Examples of R Radicals hydrogen, methyl, ethyl, propyl, i-propyl, butyl, i-butyl, sec-butyl, t-butyl, amyl, i-amyl, sec-amyl, t-amyl, hexyl, t-hexyl, heptyl, octyl, t-octyl, cyclopropyl, cyclobutyl, cyclopentyl, cyclohexyl, cyclooctyl, cyclododecyl, perhydronaphthyl, adamantyl, bicyclo[2.21]heptyl, benzyl, alpha-cumyl, 2-(beta-naphthyl) ethyl, phenyl, o, m and p-toluyl, naphthyl, triethylphenyl, phenanthryl, p-t-butylphenyl and neopentyl.

Examples of $(R)_3C$ Radicals t-butyl, t-amyl, t-cumyl, t-adamantyl, t-(1-phenyl)cyclopentyl, t-(1-phenyl)cyclohexyl, t-(2-methyl)bicyclo[2.2.1]heptyl, t-(2-methyl)bicycl[2.2.2]octyl, t-(1-phenyl)cyclopropyl, t-octyl, t-dodecyl, t-(alpha-methyl-alpha-ethyl)benzyl, t-(alpha, alpha-diethyl)benzyl, methyl, ethyl, isopropyl, isobutyl, sec-butyl, cyclohexyl, benzyl, hydroxyethyl and cyclopentyl.

Examples of $R_1$ Radicals hydrogen, methyl, ethyl, propyl, i-propyl, butyl, i-butyl, sec-butyl, t-butyl, amyl, i-amyl, sec-amyl, t-amyl, hexyl, t-hexyl, neopentyl, 2-methoxy-2-methylpropyl, n-octyl, t-octyl, cyclopropyl, cyclobutyl, cyclopentyl, cyclohexyl, cyclooctyl, cyclododecyl, perhydronaphthyl, adamantyl, bicyclo[2.2.1]heptyl, benzyl, alpha-cumyl, alpha-methyl-alpha-ethylbenzyl, alpha, alpha-diethylbenzyl, alpha-ethyl-alpha-propylbenzyl, 1-phenylcyclohexyl, 3,3,5-trimethylcyclohexyl, 4-t-butylcyclohexyl, methylcyclohexyl, trimethylcyclopentyl and 4-i-propylcyclohexyl.

Examples of $R_2$ Radicals same as $R_1$ radicals (except for hydrogen) plus phenyl, o, m and p-toluyl, naphthyl, triethylphenyl, phenanthryl, p-t-butylphenyl, m and p-methoxyphenyl, o, m, and p-bromo (or chloro) phenyl, xylyl, m-cyclopropylphenyl, p-cyclohexylphenyl, and i-propylphenyl.

Examples Where $R_1$ and $R_2$ Are Joined Together 1,1,3,3-tetramethyl-2-oxy-propylene, propylene, butylene, pentamethylene, hexamethylene, heptamethylene, octamethylene, nonamethylene, undecamethylene, 1,2 or 3-methylpentamethylene.

Examples of Substituents in $R_1$ and $R_2$ ethenyl, allyl, hexenyl, cyclopentenyl, methylcyclohexenyl, ethynyl, propynyl, hexynyl, cyclooctynyl, methoxy, ethoxy, propoxy, hexoxy, isopentoxy, methylcyclopentoxy, cyclohexoxy, phenoxy, naphthoxy, chlorophenoxy, dimethylphenoxy, ethylphenoxy, cyclohexylphenoxy, acetoxy, propionoxy, isohexanoyloxy, cyclohexanecarbonyloxy, benzoyloxy, naphthoyloxy, chlorobenzoyloxy, methylbenzoyloxy, methylnaphthoyloxy, methoxycarbonyl, ethoxycarbonyl, butoxycarbonyl, cyclohexoxycarbonyl, phenoxycarbonyl, naphthoxycarbonyl, chlorophenoxycarbonyl, methylphenoxycarbonyl, methylbiphenyloxycarbonyl, acetyl, propionly, valeroyl, cyclohexanecarbonyl, benzoyl, naphthoyl, chlorobenzoyl, methylbenzoyl, methylnaphtholyl, chlorine, bromine, iodine, fluorine, hydroxy and cyano.

Many equivalent modifications will become available to those skilled in the art without a departure from the inventive concept.

EXAMPLE 33

Preparation of 2-t-Butylazo-2-hydroxypropane

A. 2-t-Butylazo-2-hydroperoxypropane

To a 250 ml. jacketed reactor equipped with a mechanical stirrer, thermometer, water cooled condenser connected to a gas bubbler and an oxygen inlet tube was added 25 grams (0.195 mole) of acetone t-butylhydrazone and 75 grams of hexane. Oxygen was then bubbled into the rapidly stirred solution at 30°–35° C as fast as the solution could absorb it. The oxidation was followed by gas chromatography and required approximately 1 hour to go to completion. The hexane solution was cooled to about 0° C and drained into an Erlenmeyer flask and stored in the freezer for subsequent use. (Note: 2-t-butylazo-2-hydroperoxypropane is shock sensitive and should not be isolated.)

B. 2-t-Butylazo-2-hydroxypropane by Sodium Bisulfite Reduction

54 Grams (0.084 mole) of the above hexane solution was poured back into the 250 ml. reactor and a 5% solution of aqueous sodium bisulfite was added in 10 ml. increments while holding the temperature at 10° C or below by circulating ice water through the reactor jacket. The reduction was followed by gas chromatography and was complete after about 150 ml. of the 5% sodium bisulfite solution had been added. A small peak in the gas chromatographic scan corresponded to the desired 2-t-butylazo-2-hydroxypropane (about a 10–15% yield). The product was not isolated.

C. 2-t-Butylazo-2-hydroxypropane by Sodium Sulfite Reduction

46 Grams (.072 mole) of the hexane solution of 2-t-butylazo-2-hydroperoxypropane (from A) was poured into the 250 ml. reactor and a 5% solution of aqueous sodium sulfite was added in 10 ml. increments while holding the temperature at 10° C or below by circulating ice water through the reactor jacket. The reaction was not nearly as exothermic as the bisulfite reduction. The reduction was followed by gas chromatography and approximately 400 ml. of the sodium sulfite was required to completely reduce the azo-hydroperoxide. The spent sodium sulfite solution was drained from the reactor at intervals due to the limited capacity of the reactor. From the outset it was obvious that the sodium sulfite reduction system would give a much higher yield of 2-t-butylazo-2-hydroxypropane than the sodium bisulfite reduction system. From a comparison of the gas chromatographic scans it appears that the sulfite reduction gave about 6 times as much product as the bisulfite reduction. The product was not isolated.

EXAMPLE 34

Preparation of 2-t-Butylazo-2-hydroxypropane

A. 2-t-Butylazo-2-hydroperoxybutane

To a 3 liter jacketed reactor equipped with a mechanical stirrer, thermometer, water cooled condenser connected to a gas bubbler and an oxygen inlet tube was added 142 grams (1.0 mole) of methyl ethyl ketone t-butylhydrazone and 500 mls. of pentane. Oxygen was then bubbled into the rapidly stirred solution at 34° C as fast as the solution could absorb it. The oxidation was followed by gas chromatography and after about ¾ of the t-butylhydrazone had been oxidized, the temperature was dropped to 25° C and the oxidation completed.

B. 2-t-Butylazo-2-hydroxybutane

The temperature of the above solution was lowered to 5° C by circulating ice water through the reactor jacket. Then 5% aqueous sodium sulfite solution was added in 1 liter increments while holding the reaction temperature below 15° C. The reduction was followed by gas chromatography and was very low. After 5 liters of 5% sodium sulfite solution had been added, we switched to 10% aqueous sodium sulfite to speed things up. The reduction was complete after 4 liters of the 10% sodium sulfite had been added. The pentane solution was washed with saturated sodium bicarbonate solution, dried over anhydrous sodium sulfite, filtered and the pentane evaporated under reduced pressure on a rotating evaporator at 10°–15° C. The yield of 2-t-butylazo-2-hydroxybutane was 88 grams (55.5% crude yield).

What is claimed is:

1. A process which comprises reacting an α-hydroperoxy azo compound of the formula:

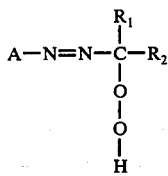

at a temperature above −10° C. and below +35° C. and at a pH of 7 and above with a reducing agent selected from sodium sulfite; potassium iodide; triphenylphosphine; sodium borohydride; sodium thiosulfate; sodium and alcohol; lithium aluminum hydride; aluminum isopropoxide; and hydrogen in the presence of a catalyst selected from Raney nickel, platinum on carbon, platinum oxide and palladium on charcoal; thereby producing an α-hydroxyazo compound having the formula:

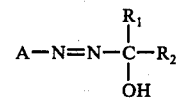

wherein in both of said formulae:

A is aryl of 6 to 14 carbons or $(R)_3C$; R is hydrogen; lower alkyl of 1 to 11 carbons; cycloalkyl, bicycloalkyl or tricycloalkyl of 3 to 12 carbons; aralkyl of 7 to 12 carbons; aryl of 6 to 14 carbons; provided that no more than one R is aryl, and the R's and C in $(R)_3C$ taken together form cycloalkyl, bicycloalkyl, or tricycloalkyl of 3 to 12 carbons;

$R_1$ is hydrogen; alkyl of 1 to 12 carbons; cycloalkyl, bicycloalkyl or tricycloalkyl of 3 to 12 carbons; aralkyl of 7 to 12 carbons;

$R_2$ is alkyl of 1 to 12 carbons; cycloalkyl, bicycloalkyl, or tricycloalkyl of 3 to 12 carbons; aralkyl of 7 to 12 carbons; aryl of 6 to 14 carbons; and $R_1$ and $R_2$ together form alkylene of 3 to 11 carbons.

2. The process of claim 1 wherein the reducing agent is sodium sulfite dissolved in water.

3. The process of claim 1 wherein each of R, $R_1$ and $R_2$ is alkyl of 1 to 8 carbons.

4. The process of claim 1 wherein said reacting is effected in a low boiling hydrocarbon solvent.

5. The process of claim 4 wherein said α-hydroxyazo compound produced by said reacting is isolated.

* * * * *